United States Patent
Bregman et al.

(10) Patent No.: US 12,373,203 B2
(45) Date of Patent: Jul. 29, 2025

(54) DEVELOPMENT ENVIRONMENT INTEGRATED WITH INFRASTRUCTURE COST ESTIMATION SYSTEM

(71) Applicant: Red Hat Israel Ltd., Raanana (IL)

(72) Inventors: Arie Bregman, Gan Yavne (IL); Nir Magnezi, Pegah Tikva (IL)

(73) Assignee: Red Hat Israel Ltd., Raanana (IL)

( * ) Notice: Subject to any disclaimer, the term of this patent is extended or adjusted under 35 U.S.C. 154(b) by 145 days.

(21) Appl. No.: 18/193,900

(22) Filed: Mar. 31, 2023

(65) Prior Publication Data
US 2024/0329983 A1    Oct. 3, 2024

(51) Int. Cl.
| | |
|---|---|
| *G06F 8/36* | (2018.01) |
| *G06F 8/30* | (2018.01) |
| *G06F 8/33* | (2018.01) |
| *G06F 8/34* | (2018.01) |
| *G06F 8/35* | (2018.01) |
| *G06F 8/77* | (2018.01) |
| *G06F 8/10* | (2018.01) |
| *G06F 8/51* | (2018.01) |
| *G06F 8/65* | (2018.01) |
| *G06F 9/445* | (2018.01) |
| *G06F 9/455* | (2018.01) |
| *G06F 9/50* | (2006.01) |
| *G06F 9/54* | (2006.01) |

(52) U.S. Cl.
CPC .......... *G06F 8/77* (2013.01); *G06F 8/30* (2013.01); *G06F 8/10* (2013.01); *G06F 8/33* (2013.01); *G06F 8/34* (2013.01); *G06F 8/35* (2013.01); *G06F 8/36* (2013.01); *G06F 8/51* (2013.01); *G06F 8/65* (2013.01); *G06F 9/44505* (2013.01); *G06F 9/455* (2013.01); *G06F 9/5027* (2013.01); *G06F 9/5072* (2013.01); *G06F 9/54* (2013.01)

(58) Field of Classification Search
CPC ..... G06F 8/77; G06F 8/30; G06F 8/36; G06F 8/34; G06F 8/33; G06F 8/35; G06F 8/10; G06F 8/51; G06F 8/65; G06F 9/5072; G06F 9/44505; G06F 9/5027; G06F 9/455; G06F 9/54
See application file for complete search history.

(56) References Cited

U.S. PATENT DOCUMENTS

| | | | |
|---|---|---|---|
| 11,907,731 B1* | 2/2024 | Resios | G06F 9/44505 |
| 2021/0318912 A1* | 10/2021 | Hashimoto | H04L 41/5045 |
| 2022/0309418 A1* | 9/2022 | Chivukula | G06F 8/71 |
| 2024/0086190 A1* | 3/2024 | Kwatra | G06F 8/60 |
| 2024/0112199 A1* | 4/2024 | Sudakovitch | G06Q 30/018 |
| 2024/0303043 A1* | 9/2024 | Duggal | G06F 8/10 |

OTHER PUBLICATIONS

Tiago Espinha Gasiba et al., Raising Security Awareness of Cloud Deployments using Infrastructure as Code through CyberSecurity Challenges, 2021, [Retrieved on Jan. 31, 2025]. Retrieved from the internet: <URL: https://dl.acm.org/doi/pdf/10.1145/3465481.3470030> 8 Pages (1-8) (Year: 2021).*

* cited by examiner

Primary Examiner — Anibal Rivera
(74) Attorney, Agent, or Firm — Dority & Manning, P.A.

(57) ABSTRACT

A method may include detecting, by an integrated development environment (IDE), a code modification of an Infrastructure as Code (IaC) module; identifying a resource modification associated with the code modification; determining an estimated cost associated with the resource modification; and visually rendering information reflecting the estimated cost in a visual association with the code modification.

20 Claims, 6 Drawing Sheets

```
module "ec2" {
  source       = "./../../"
  name         = "ec2"
  environment  = "test"
  label_order  = ["name", "environment"]

#instance
  instance_enabled = true
  instance_count   = 1
  ami              = "ami-08d658f84a6d84a80"
  instance_type    = "t2.nano"
  monitoring       = false
  tenancy          = "default"
  hibernation      = false
```

⤺ 300A

⤺ 300B

```
diff --git a/terraform/ec2.tf b/terraform/ec2.tf
index ef13acb..4016c24 100644
--- a/terraform/ec2.tf
+++ b/terraform/ec2.tf
@@ -140,9 +140,9 @@ module "ec2" { instance
  instance_enabled = true
-  instance_count   = 1                                  ⎫ 310
+  instance_count   = 2                                  ⎭
  ami              = "ami-08d658f84a6d84a80"
-  instance_type    = "t2.nano"                          ⎫ 320
+  instance_type    = "t2.small"                         ⎭
  monitoring       = false
  tenancy          = "default"
  hibernation      = false
```

FIG. 3

DEVELOPMENT ENVIRONMENT INTEGRATED WITH INFRASTRUCTURE COST ESTIMATION SYSTEM

The present disclosure is generally related to integrated development environments (IDEs), and more particularly, to integrating an infrastructure cost estimation system with a development environment.

BACKGROUND

Integrated development environments (IDEs) enhance the speed and efficiency of computer programming by providing a user application that enables computer programmers to create, modify, build, and test a computer program. An IDE can provide a single integrated user interface that interacts with one or more development tools, such as, a text editor, a syntax checker, a compiler, a debugger, and a version control system.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 3 depicts examples of IaC module and IaC modification data, in accordance with one or more aspects of the present disclosure;

DETAILED DESCRIPTION

Figure 1:
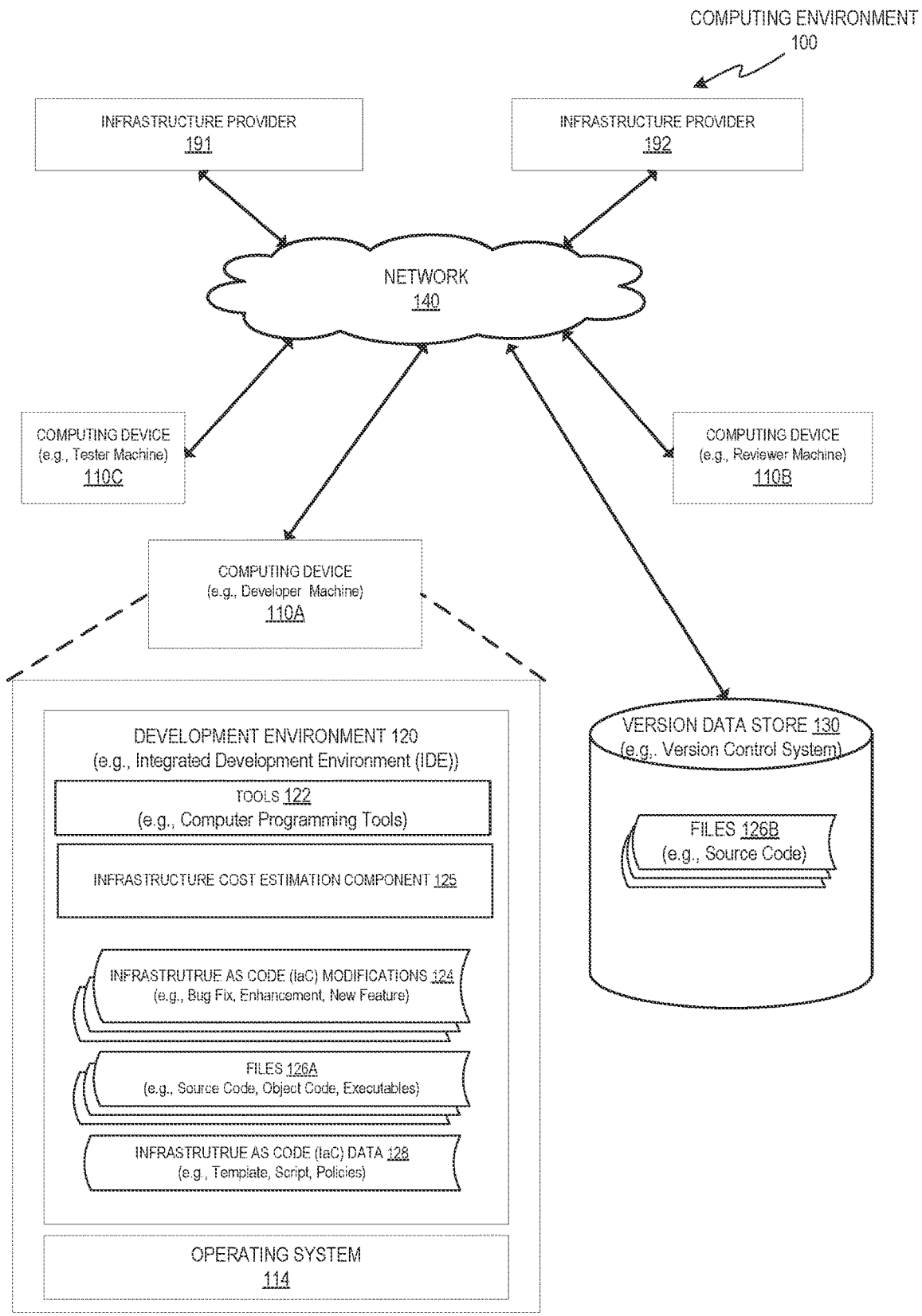
FIG. 1 depicts a high-level block diagram of an example computing environment that includes a continuous integration build tool user interface, in accordance with one or more aspects of the present disclosure.

Described herein are systems and methods for integrating an infrastructure cost estimation system with a development environment. A development environment, such as a text editor or an Integrated Development Environment (IDE), may be used to develop (e.g., create, test, and change) computer program code in a programming language. The program code may be in the form of source code stored in files that are processed by the interpreters or compilers of, for example, continuous integration tools. In computer program development, continuous integration is the practice of merging developer working copies of computer program code for an application into a shared mainline code base, generally, several times a day. With continuous integration, each computer program developer team member submits source code for the application being developed on a daily (or more frequent) basis, and a set of operations referred to as a build process is performed to produce executable code (e.g., for an application) from the source code. The set of operations may include compiling source code files to produce the executable code for an application, performing tests on the executable code, and instating or deploying the executable code. The build process may be performed at periodic times, or with each significant source code change. Isolated source code changes can be tested as part of the build process when the source code is added to the larger mainline code base.

Infrastructure as Code (IaC) is an operational paradigm of managing and provisioning of computing infrastructure through executable code. An IaC process can create configuration files that contain infrastructure specifications, which makes it easier to edit and distribute configurations. IaC also ensures the provision of the environment according to the infrastructure specifications. By codifying and documenting the configuration specifications, IaC gives a template to follow for provisioning the infrastructure, aids configuration management, and helps to avoid undocumented, ad-hoc configuration changes. Deploying IaC may involve dividing the infrastructure into modular components that can then be combined in different ways through automation. Automating infrastructure provisioning with IaC means that developers do not need to manually provision and manage servers, operating systems, storage, and other infrastructure components each time they develop or deploy an application.

IaC is an important part of implementing continuous integration/continuous delivery (CI/CD). CI/CD is a method to frequently deliver software (e.g., application) to customers by introducing automation into the stages of software development. CI/CD relies on ongoing automation and continuous monitoring throughout the application life cycle, from integration and testing to delivery and deployment. Taken together, these connected practices are often referred to as a "CI/CD pipeline." Infrastructure can go through the same CI/CD pipeline as an application does during software development, applying the same testing and version control to the infrastructure code.

The "CI" in CI/CD refers to continuous integration that is an automation process for developers. Successful CI means new code changes to an application are regularly built, tested, and merged to a shared repository. The "CD" in CI/CD refers to continuous delivery and/or continuous deployment, where continuous delivery means a developer's changes to an application are automatically bug tested and uploaded to a repository, and continuous deployment means automatically releasing a developer's changes from the repository to production for deployment, where it is usable by customers.

As IDE enables a user to perform program modifications, modification of IaC related code can be time consuming, cost inefficient, and error prone. For example, modification of IaC related code usually leads to a change in expense (e.g., cost of infrastructure), which would not be checked or known by the code developer or reviewer until either in CI/CD process or after the modification has been deployed.

Aspects of the present disclosure address the above-noted and other deficiencies by enhancing an IDE with an infrastructure cost estimation system. The infrastructure cost estimation system may serve as an extension or plug-in to the IDE. The infrastructure cost estimation system can continuously (e.g., with specified frequency or upon requests) perform cost estimation for every modification of IaC related code, which can be used by code developer or reviewer to decide whether to accept the modification. The IaC related code refers to code in one or more IaC modules representing configuration specifications. In an illustrative example, for an initial use of the infrastructure cost estimation system with the development environment, the infrastructure cost estimation system may use existing data of IaC (e.g., the data representing the resources managed as IaC) to retrieve or calculate an initial infrastructure cost associated with the IaC. The infrastructure cost estimation system may also send one or more authentication requests to the infrastructure provider (e.g., a system providing the infrastructure to a client), and the authentication would verify the identity of the IDE (e.g., via the computing device that requests the infrastructure cost estimation), and when succeeds, allow the IDE to connect to the infrastructure provider to use API for infrastructure cost calculation.

Enhanced with an infrastructure cost estimation plug-in, the IDE may make a modification to a set of IaC related codes ("IaC modification," "code modification of an IaC module," or "code modification") on a build tool. The IDE may track the modification in real-time, at a predetermined frequency, or upon receiving a cost estimation request from a code developer or review (e.g., via a computing device). The IDE may verify the modification for certain errors (e.g., syntax errors, logic errors, compilation errors, runtime errors, and so on). The IDE may detect a code modification of an IaC module, retrieve the code modification data stored in a data store, and identify data representing the change of the infrastructure resources ("resource modification") associated with the code modification. The IDE may send, to an infrastructure provider, a request for an estimated cost associated with the resource modification. In the case that the infrastructure provider has allowed to connect with the IDE (e.g., a computing device that requests the infrastructure cost estimation) for infrastructure cost estimation, the infrastructure provider may provide a customized price or a generalized price of infrastructure according to the resource modification data. Additionally, or alternatively, in a situation where a specific infrastructure provider is an intended recipient for the request but has not allowed to connect to the IDE for infrastructure cost estimation, the IDE may send the request to a public price repository, where the public price repository may provide a public price of infrastructure according to the resource modification data.

Upon receiving an estimated cost (e.g., a customized price, a generalized price, or a public price), the IDE may analyze the estimated cost and generate a recommendation regarding the code modification. In some implementations, analyzing the estimated cost may involve comparing the estimated cost with the current infrastructure cost (i.e., the infrastructure cost without the code modification). For example, the current infrastructure cost can be initial infrastructure cost associated with the IaC as described above or an infrastructure cost calculated in real time by accessing the current state file or database. In one example, the IDE may determine that the estimated cost is lower than the current infrastructure cost and generate a recommendation to accept the code modification. In another example, the IDE may determine that the estimated cost is higher than the current infrastructure cost and generate a recommendation to refuse the code modification. In yet another example, the IDE may determine that the value difference between the estimated cost and the current infrastructure cost is within a predetermined range (e.g., specified in a business policy) and generate a recommendation to accept the code modification.

In some implementations, the IDE may analyze the estimated cost by determining whether the estimated cost satisfies a threshold criterion (e.g., whether the estimated cost does not exceed a predefined value). For example, the infrastructure cost estimation system may determine that the estimated cost exceeds a predefined value and generate a recommendation to refuse the code modification. In another example, the infrastructure cost estimation system may determine the estimated cost does not exceed a predefined value and generate a recommendation to accept the code modification.

The IDE may visually render information reflecting the estimated cost in a visual association with the code modification. The information reflecting the estimated cost may include the recommendation associated with the code modification, the received estimated cost displayed in a range graph, etc. For example, the IDE may display, via a graphical user interface (GUI), the recommendation (e.g., displayed in a form of message) along with the code modification, for example, including which line of the source code is being modified, and whether to accept or refuse the modification.

Advantages of the present disclosure include increasing IaC management efficiency by using an infrastructure cost estimation system in the IDE. Because assessing the infrastructure cost is brought in an early stage of code modification process, the present disclosure enhances compute performance by reducing power consumption, memory consumption, latency, and/or CPU usage, and reducing resources waste due to system switching back after IaC modification based on infrastructure cost considerations.

FIG. 1 depicts a high-level block diagram of an example computing environment 100 that includes an infrastructure cost estimation component 125, in accordance with one or more aspects of the present disclosure. Computing environment 100 may be a development platform that enables users to design, create, edit, configure, test, and deploy computer programs. In one example, computing environment 100 may be development platform that uses native applications, web-based applications, cloud based applications, other applications, or a combination thereof. The development platform may be the same or similar to RedHat® OpenShift®, Microsoft® Azure Devops®, Oracle® Application Express® (APEX), other development platform, or a combination thereof. In the example illustrated, computing environment 100 may include one or more computing devices 110A-C, a development environment 120, a version data store 130, a network 140, on-premises infrastructure provider(s) 191, and cloud infrastructure provider(s) 192.

Computing devices 110A-C may include desktop computers, laptop computers, mobile phones, tablet computers, other personal computing devices, server computers, or a combination thereof. In some implementations, computing device 110 may be referred to as a "client device" or "user device" and be associated with one or more users that are functioning in one or more development roles (e.g., designer, developer, reviewer, tester, manager, or documenter) and performing one or more development tasks (e.g., design, development, reviewing, testing, verifying, documenting). Each of the computing devices 110A-C may execute an operating system (e.g., operating system 114).

Operating system 114 may be any program or combination of programs that can manage computing resources of computing device 110A. Operating system 114 may include a kernel comprising one or more kernel space programs (e.g., memory driver, network driver, file system driver) for interacting with virtual or physical hardware devices. In one example, operating system 114 may include Linux®, Solaris®, Microsoft Windows®, Apple Mac®, other operating system, or a combination thereof. Each of the computing devices 110A-C can provide a development environment 120 for a respective user.

Development environment 120 may include one or more applications that enable a user to work on a computer program. The one or more applications can include a user interface that is provided to the user to working on program modification for one or more computer program. The work can involve any one or more of the development tasks discussed above and can include editing, reviewing, testing, debugging, or a combination thereof. The user interface can be a graphical interface (e.g., graphical user interface (GUI)), a textual interface (e.g., command line interface (CLI)), audio interface, camera interface, or a combination thereof. Develop environment 120 may integrate with one or more tools 122 and be referred to as an integrated development environment (IDE). The integrated development environment may be a computer program that provides one or more user interfaces that enable a user to interact with the tools. Examples of integrated development environments include, for example, Eclipse®, PyCharm®, Microsoft Visual Studio®, Apple Xcode®, Oracle NetBeans®, IBM Rational Application Developer®, GNU Emacs®, Jupyter Notebook®, other IDE or development tool, or a combination thereof.

Tools 122 may be used for developing the computer program and may be referred to as development tools or computer programming tools. Tools 122 may include one or more text editors, syntax checkers, compilers, linkers, interpreters, debuggers, testing tools, version control system, bug tracking system, build automation tools, deployment tools, modeling tools, class browser, an object browser, and a class hierarchy diagram, simulators, emulators, virtual machines, containers, other tools, or a combination thereof. Each of the tools 122 may be one or more standalone computer programs or may be computer programs that are integrated with another computer program (e.g., plug-in for IDE, web application for web browser). Tools 122 of the development environment 120 can be used to work on program modifications 124.

Tool 122 may include a compiler to compile computer source code into executable code, and to generate other build output, such as a compiler log that contains output describing progress and results of the compilation process. Tool 122 may include a unit tester and an integration tester for running automated tests on artifacts (e.g., tangible by-products produced during software development). Unit tester may test that the individual functions in the source code or executable code work properly and generate unit test log that contains output(s) describing progress and results of the unit tester. Integration tester may test the executable code in an environment in which the executable code is expected to be executed by users. For example, integration tester may create a cluster of virtual resource for the integration testing of the artifacts. The virtual resources in cluster may include containers, virtual machines, container(s) within a virtual machine, and/or virtual machine(s) running within a container.

Tool 122 may include continuous integration build tool for performing continuous build operations (e.g., performing a build at periodic intervals or in response to user requests), and presenting information about the status of executing builds and the results of completed builds. Continuous integration build tool may start builds, e.g., by executing compiler, unit tester, and integration tester in accordance with a build configuration script that contains instructions for compiling the source code and testing the resulting executable code. Continuous integration build tool may monitor build output and display progress information, such as the stage of the build (e.g., compiling, unit testing, or integration testing), the status of an executing build (e.g., how many files have been compiled, how many tests have passed, and how many tests have failed). Continuous integration build tool may detect the completion of a build by receiving a result value from compiler, unit tester, and integration tester, or by detecting text in the build output logs, for example. Continuous integration build tool may generate an integration test log containing information describing the progress of the operations performed by the continuous integration build tool.

Tool 122 may be located on a client device and/or a service device. Tool 122 may execute a set of operations to provide the build process of the infrastructure as code. The infrastructure as code may be the base of a project on which development progresses. The set of operations may include compiling the code, testing the code when the code is compiled, testing isolated code when the code is added to the larger mainline code base, and performing continuous build operations e.g., performing a build process at periodic intervals or in response to user requests, and presenting information about the status of executing builds and the results of completed build process. Users, such as computer program development team members, may use a development environment to submit source code to tool 122 and request execution of a build process for the submission.

Infrastructure as code (IaC) modifications 124 can include any modification to one or more computer code related to IaC ("IaC related code"). The IaC related code refers to code in one or more IaC modules representing configuration specifications, and may be a set of instructions that affects the deployment of infrastructure, can be executed by a processor, and runs in user mode (e.g., user program), system mode (e.g., system program), other mode, or a combination thereof. A modification to the IaC related code may involve source code, executable code, settings data, other data, or a combination thereof. The source code may include an ordered set of statements in a human-readable programming language that can be transformed into executable code by an assembler, compiler, linker, interpreter, and/or other tools. The executable code is machine code that can be executed by a processor of a computing device. The settings may include configurable settings that affect executable code.

Files 126A may be storage objects that store the source code, executable code, settings data, other data, or a combination thereof. In one example, files 126A may be source code files. Files 126A may include the changes associated with one or more IaC modifications 124. In the example shown in FIG. 1, files 126A may be stored in computing device 110A and may be specific versions of files 126B that are stored in version data store 130. Version data store 130 may be a data store that stores files 126B and each of files 126B may include one or more versions.

Version data store 130 may be referred to as a source code repository, a program repository, a package repository, an image repository, a document repository, other repository, or a combination thereof. Version data store 130 may include a single data storage device or multiple storage devices and may store data as one or more file system objects (e.g., files, directories), database objects (e.g., records), data blobs (e.g., continuous or non-continuous bit series), other data storage objects, or a combination thereof.

Version data store 130 may be a decentralized data store, a centralized data store, or a combination thereof. In the example shown in FIG. 1, version data store 130 may be a centralized content store that provides centralized access to files and specific versions of files 126B are accessed by computing device 110A and stored as files 126A. In another example (not shown), version data store 130 may be a decentralized content store that distributes files 126B across one or more storage devices (e.g., computing devices 110A-C).

Version data store 130 may be associated with a version control service that is accessible to development environment 120 and is used to track IaC modifications 124. The version control service may be the same or similar to a Revision Control System (RCS), a Software Configuration Management system (SCM), a Source Code Control System (SCCS), a Version Control System (VCS), other system, or a combination thereof. In one example, the version control service may be the same or similar to GIT (e.g., content addressable storage), Apache Subversion® (SVN), Concurrent Versions System (CVS®), Bit Keeper®, Perforce®, AccuRev®, ClearCase®, Rational Team Concert®, Visual SourceSafe®, other product or service, or a combination thereof.

Development environment 120 may enable the computing device 110A to access version data store 130 that uses content addressable storage, location addressable storage, or a combination thereof. Content addressable storage (CAS) may be data storage that stores and retrieves objects (e.g., files) based on the content of the object and not the storage location of the object. The identifiers used to retrieve objects may be the same or similar to object hashes and may be a direct representation of the content of the object. For example, a content addressable storage identifier may be a hash of one or more files and a modification of the content of the file causes the hash to be recomputed. Object hashes can include one or more hash values that may be generated by one or more hash function and may represent portions of data. Content addressable storage may be a permanent-storage analogue to content-addressable memory and may be intended to store data that does not change or changes infrequently. When the stored objects remain unchanged, the content addressable storage may be referred to as Fixed Content Storage (FCS). In one example, version data store 130 may be a decentralized content addressable storage system that is the same or similar to the GIT distributed version control system and computing device 110C may access versions of files 126B using object hashes as identifiers.

Location addressable storage is different from content addressable storage and may store and retrieve versions of files 126B based on location identifiers as opposed to content identifiers. The location identifier may identify a particular location where the versioned code object is being stored and may be independent from the content of the stored version. Whether the content is changed after it is stored may have no effect on the location identifier used to retrieve the stored version. A location identifier may identify a file based on a file name or storage path (e.g., relative or absolute path) or may identify a record based on a key (e.g., object identifier (OID)) and neither the file name, storage path, or key may be affected when the content of the file or record is changed.

In either content addressable storage or location addressable storage, version data store 130 may organize the versions of files using branches, where branches may enable files to be changed in parallel by isolating changes on a branch from changes on another branch. A branch may be specific to a set of one or more program modifications (e.g., bug fixes or enhancements), users (e.g., developers, IT administrators), locations (e.g., geographically separated sites), entities (e.g., teams or companies), other separation, or a combination thereof. A branch may be both a child branch and a parent branch and may be created by a user (e.g., developer) to isolate changes for a particular program modification (e.g., bug fix).

The version data store 130 may store version relationship data that represents the relationship of a version of files to other versions. The version relationship data may be derived from a version tree data structure and be stored in version data store 130. The version relationship data may be used to integrate changes of a program modification across branches (e.g., push, deliver, rebase). The integration may propagate changes between branches of a tree data structure and may create a new version on a destination branch that will include changes from a source branch. The integration may involve one or more operations that include copying, moving, merging, removing, adding, other operation, or a combination thereof.

Development environment 120 may include an infrastructure cost estimation component (e.g., a plug-in) 125. The infrastructure cost estimation component 125 may enable the development environment 120 to determine an estimated cost associated with a particular one of the IaC modifications 124. Development environment 120 may store the infrastructure cost estimation data in the infrastructure as code (IaC) data 128. The infrastructure cost estimation component 125 is discussed in more detail below with respect to FIG. 2.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

In various implementations, developers, owners, and/or system administrators of the infrastructure may provide infrastructure services on premises or in cloud. This can be accomplished by using an application programmer interface (API) within the applicable on-premises or cloud infrastructure provider system 191, 192. In some implementations infrastructure provider system 191, 192 may be accessible from a computing device (e.g., computing device 110A) that includes dedicated software to interact with various cloud components. Additionally, or alternatively, the infrastructure provider system 191, 192 may be accessed using a web-based or cloud-based application that executes on a separate computing device (e.g., a server) that communicates with computing device 110A via a network 140. The infrastructure provider system 191, 192 may include one or more machines such as server computers, desktop computers, etc.

Figure 2:
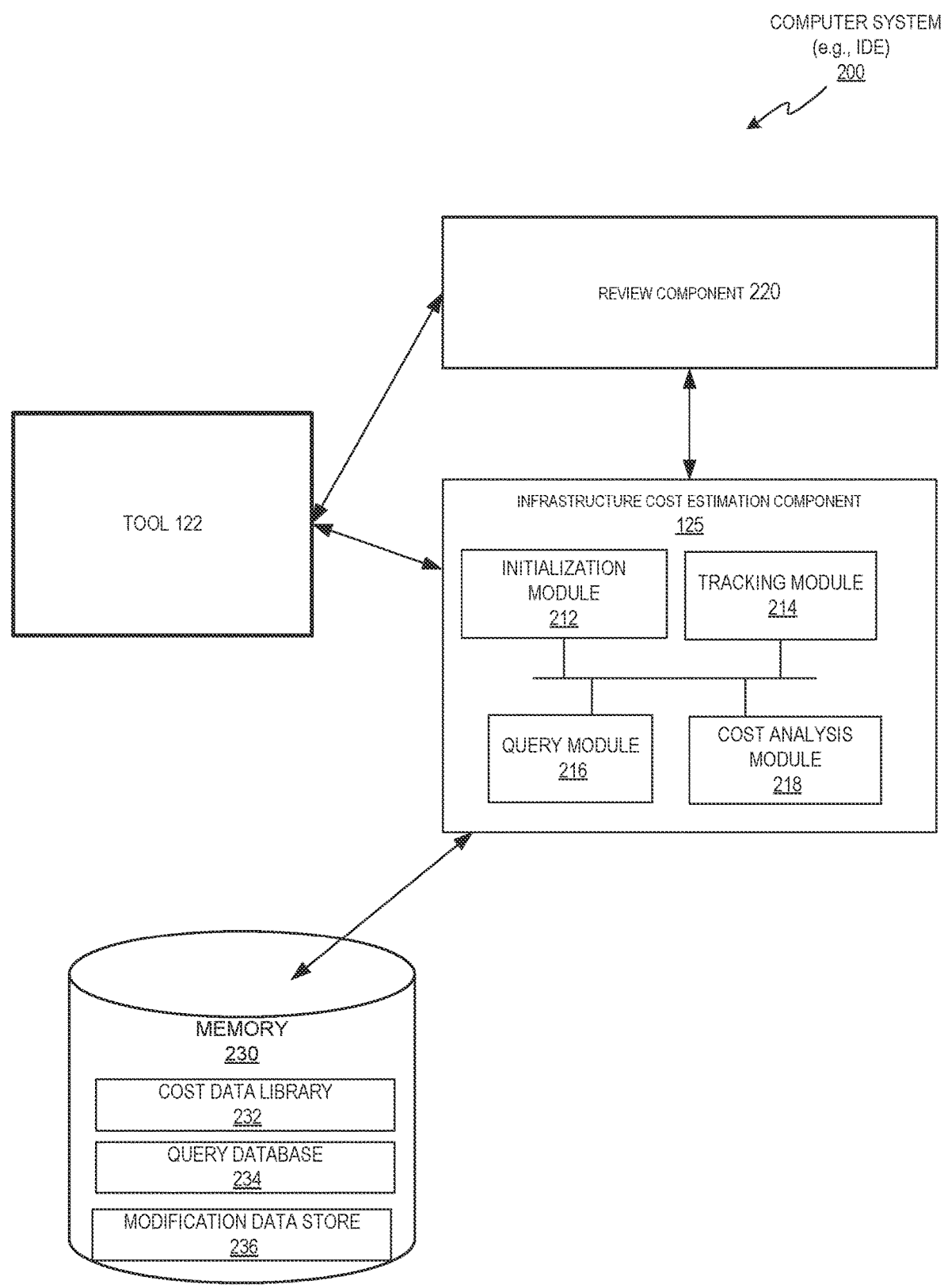
FIG. 2 depicts a block diagram illustrating components and modules of an example computer system, in accordance with one or more aspects of the present disclosure.

FIG. 2 is a block diagram illustrating example components and modules of computer system 200, in accordance with one or more aspects of the present disclosure. In the example shown, computer system 200 may be a development environment (e.g., IDE) running on a computing device (e.g., computing device 110A) and may include tool 122, infrastructure cost estimation component 125, review component 220, and memory 230. Infrastructure cost estimation component 125 may include an initialization module 212, tracking module 214, query module 216, and cost analysis module 218. Review component 220 may run executable code that implements one or more of the components and modules and may be implemented within a host operating system, a hypervisor, a guest operating system, a container, hardware firmware, or a combination thereof. Memory 230 may include library 232 and website database 234.

Initialization module 212 may initiate execution of an instruction for infrastructure cost estimation. In some embodiments, initialization module 212 may receive a request from a computing device (e.g., tool 122) specifying when to perform a particular infrastructure cost estimation. In some embodiments, initialization module 212 may access the IaC data 128 to obtain data (e.g., current state file or database) representing the initial resources managed within IaC module ("initial IaC data"), query the query database 234 by using the initial IaC data to calculate the initial infrastructure cost, and store the initial infrastructure cost in the cost data library 232.

In some embodiments, initialization module 212 may send one or more authentication requests to connect to one or more infrastructure providers to use API for infrastructure cost calculation. In some embodiments, an external authentication controller may perform one or more authentication operations to connect the IDE with infrastructure provider 191, 192 for obtaining the information from the infrastructure provider 191, 192. The authentication may include the permission to use the API for infrastructure cost calculation. In some embodiments, the authentication cannot be performed because the IDE has not allowed such operations, and in such case, initialization module may send to the IDE a notification requesting authentication permission, and/or a warning, along with an available public price, indicating a more accurate cost calculation would require an authentication. For example, the public price may be available in the query database 234.

Tracking module 214 may track the IaC modification data by using the version control system to detect each time a new version including the IaC modification data is submitted by a code developer via the tool 122 and stored in the memory 230. The tracking module 214 may monitor the modification data store 236 to detect a new version including the IaC modification data stored in the modification data store 236.

In some embodiments, tracking module 214 may communicate with tool 122 to retrieve and/or receive IaC modification data. The IaC modification data may include which line of the infrastructure code is being modified, whether a programming error (e.g., syntax error, logic error, compilation error, runtime error) occurred with the modification, and so forth. In some embodiments, tracking module 214 may communicate with tool 122 via a program capable of handling periodic requests for data (e.g., IaC modifications data), such as a daemon. In some embodiments, tracking module 214 may communicate with tool 122 upon receiving a request for data (e.g., IaC modifications data).

In some embodiments, tracking module 214 may read one or more logs generated by tool 122 to retrieve the IaC modification data. For example, tool 122 may generate a log describing the progress of the IaC modification performed by tool 122. For example, the log may include data from the compiler log, the build output log, the unit test log, the integration test log, task failures, diagnostics data, etc. The log may be generated in a file format, such as, for example, JSON (JavaScript Object Notation), XML (Extensible Markup Language), and so forth. Tracking module 214 may retrieve and/or receive the log and extract IaC modification data from the log.

In yet another example, tracking module 214 may listen to network traffic generated by tool 122 to obtain the IaC modification data. For example, tracking module 214 may capture data packets transmitted or received by tool 122 (e.g., to or from the review component 220) using, for example, a packet sniffer, a filter, etc.

Tracking module 214 may identify data representing the change of the infrastructure resources ("resource modification data") by converting the IaC modification data to resource modification data, where the resource modification data can be used by other components (e.g., query module 216 and/or cost analysis module 218) for infrastructure cost analysis. For example, tracking module 214 may use a build-in planning mechanism to convert the IaC modification data to the resource modification data. The build-in planning mechanism translates the changes in the infrastructure code (e.g., source code) to the data that can be used for requesting infrastructure cost query (e.g., memory change data, CPU change data, etc.) through an API call.

FIG. 3 illustrates examples of the IaC modification data. As shown in FIG. 3, the code 300A illustrates a IaC module, which provides a virtual server for running applications on the infrastructure. The IaC module can provide instances with different configurations of CPU, memory, storage and networking resources. In the code 300A, one instance is created (i.e., instance_count=1), and the instance is in a "nano" type, corresponding to the size of the CPU, memory, storage and networking resources. As shown in FIG. 3, the code 300B illustrates the modification of the IaC module, which includes the IaC modification data 310 and the IaC modification data 320. The IaC modification data 310 shows the change from one instance created (i.e., instance_count=1) to two instances created (i.e., instance_count=2). The IaC modification data 320 shows the change of the instance type from "nano" to "small." For example, assuming one instance of "nano" type provides 1 CPU and 512 MB memory, and one instance of "small" type provides 2 CPUs and 1024 MB memory, the IaC modification data 310 and 320 would provide a change in resources from 1 CPU and 512 MB memory to 4 CPUs and 2048 MB memory. Thus, the tracking module 214 may convert the IaC modification data 310 and 320 to the resource modification data, which shows that the resource changes from 1 CPU and 512 MB memory to 4 CPUs and 2048 MB memory.

Before converting the IaC modification data to the resource modification data, tracking module 214 may perform a set of pre-conversion operations. For example, tracking module 214 may verify the IaC modification data for certain errors (e.g., syntax errors, logic errors, compilation errors, runtime errors, and so on). In some embodiments, tracking module 214 may verify the IaC modification data by reading and extracting failure data from the log described above. The failure data may further indicate the type of failure that occurred (e.g., type of programming error, such as a syntax error, a logic error, a compilation error, a runtime error, a test integration failure, etc.).

Tracking module 214 may further enable a graphic user interface (GUI) to display the IaC modification data to the user. For example, the GUI may display a viewing area (e.g., a window) showing a section of lines of code of the infrastructure code (e.g., source code). A single line of code, from the displayed section, which is being modified by tool 122 may be identified (e.g., highlighted, pointed to, etc.) by the GUI. In some embodiments, the user can scroll through the viewing area to view each line of the infrastructure code.

Query module 216 may generate a command (e.g., a HTTP request) querying for infrastructure cost, send the query to infrastructure provider 191, 192 or other cost provider, and receive, from the provider, a response regarding the infrastructure cost price. Query module 216 may store the infrastructure cost price ("estimated cost") in the query data base 234. In some implementations, query module 216 may send a request of an estimated cost associated with the resource modification, and in response, receive the estimated cost associated with the resource modification. The request may include data of the resource modification. In some implementations, query module 216 may send the request to an infrastructure provider that has been authenticated and connected with the computer system 220. The infrastructure provider may provide a customized price or a generalized price according to the resource modification. In some implementations, a specific infrastructure provider is an intended recipient for the request, which the computer system 200 has not been authenticated to connect with, and in such case, the query module 216 may send the request to a public price repository, and the public price repository may provide a public price according to the resource modification.

Cost analysis module 218 may analyze the estimated cost and generate a recommendation regarding the code modification based on the analysis of the estimated cost. In some implementations, the cost analysis module 218 may analyze the estimated cost by comparing the estimated cost with a current infrastructure cost. In some examples, the current infrastructure cost may be the initial infrastructure cost described above, and the cost analysis module 218 may access to the cost data library 232 to retrieve the initial infrastructure cost and compare the initial infrastructure cost with the estimated cost. In some examples, the cost analysis module 218 may access the IaC data 128 to obtain data representing the current resources managed as infrastructure ("current IaC data"), query the query database 234 by using the current IaC data to obtain the current infrastructure cost, store the current infrastructure cost in the cost data library 232, and compare the current infrastructure cost with the estimated cost.

For example, the cost analysis module 218 may determine that the estimated cost is lower than the current infrastructure cost, and the processing device may then generate a recommendation to accept the code modification. In another example, the cost analysis module 218 may determine that the estimated cost is higher than the current infrastructure cost, and may then generate a recommendation to refuse the code modification. In yet another example, the cost analysis module 218 may determine that the value difference between the estimated cost and the current infrastructure cost is within a predetermined range, and may then generate a recommendation to accept the code modification.

In some implementations, the cost analysis module 218 may analyze the estimated cost by determining whether the estimated cost satisfies a threshold criterion. In some implementations, determining whether the estimated cost satisfies a threshold criterion may involve determining whether the estimated cost does not exceed a predefined value. For example, the cost analysis module 218 may determine that the estimated cost exceeds a predefined value and thus determine that the estimated cost does not satisfy the threshold criterion, and the cost analysis module 218 may then generate a recommendation to refuse the code modification. In another example, the cost analysis module 218 may determine that the estimated cost does not exceed a predefined value and thus determine that the estimated cost satisfies the threshold criterion, and the cost analysis module 218 may then generate a recommendation to accept the code modification.

Cost analysis module 218 may generate a recommendation report. In some implementation, multiple code modification occurs, for example, code modification regarding memory, code modification regarding CPU, etc. The recommendation report may include each code modification that occurred, the location of each code modification (e.g., which line of code, etc.), and a recommendation for each code modification. A recommendation may include an acceptance or refusal to edit the line(s) of source code following the code modification. Cost analysis module 218 may determine a recommendation for each code modification and may store the recommendation associated with the code modification in library 232. Cost analysis module 218 may notify the tool 122 or the review component 200 of the recommendation associated with the code modification.

The computer system 200 may visually render information reflecting the estimated cost in a visual association with the code modification. The information reflecting the estimated cost may include the recommendation (e.g., in a form of message) associated with the code modification, the received estimated cost displayed in a range graph, etc. For example, the computer system 200 may provide a GUI to display the information reflecting the estimated cost along with the code modification.

The computing system 200 may present the source code and the code modification to the reviewing user. The code modification can be presented (e.g., indicated) in the file by emphasis, such as a different background color or shading from other portions of the file. The emphasis can also include lines or rectangles drawn around the code modification. The computing system 200 may present information reflecting the estimated cost (e.g., a graph, or a message regarding the estimated cost) at a location near the displayed code modification (e.g., on the same line as the code presented as the code modification) to represent the visual association with the code modification. The information reflecting the estimated cost can be shown within a dash rectangle around the corresponding code modification. The location can be specified by one or more points, text line numbers, character positions on lines (e.g., offsets from the beginning of the line), pixel coordinates (e.g., upper left and lower right pixels of a bounding box surrounding the code presented as the code modification, such as the dashed rectangle), or other suitable information. "Near" means a threshold distance that can be specified in units such as text lines or pixels, or other units, such as centimeters, inches, or text characters. The visual association of the information reflecting the estimated cost and the code modification can also be shown as an arrow, a dashed line, etc.

The computer system 200 may inject the recommendation into a message provided by the user through the tool 122 and send the message with recommendation data to the review component 200. Review component 220 may display the message with recommendation data. The message with recommendation data may include which line of the source code is being modified, and whether to accept or refuse the modification. For example, the review component 220 may display a viewing area showing a section of lines of code of the source code and indicating which line of code from the displayed section is being modified (e.g., by highlighting). Review component 220 may also display other review data, including which stage of the pipeline (e.g., the compile stage, the test stage, the deploy stage, etc.) is executing, which line of the source code is being executed, whether a programming error (e.g., syntax error, logic error, compilation error, runtime error) occurred, and so forth.

Figure 4:
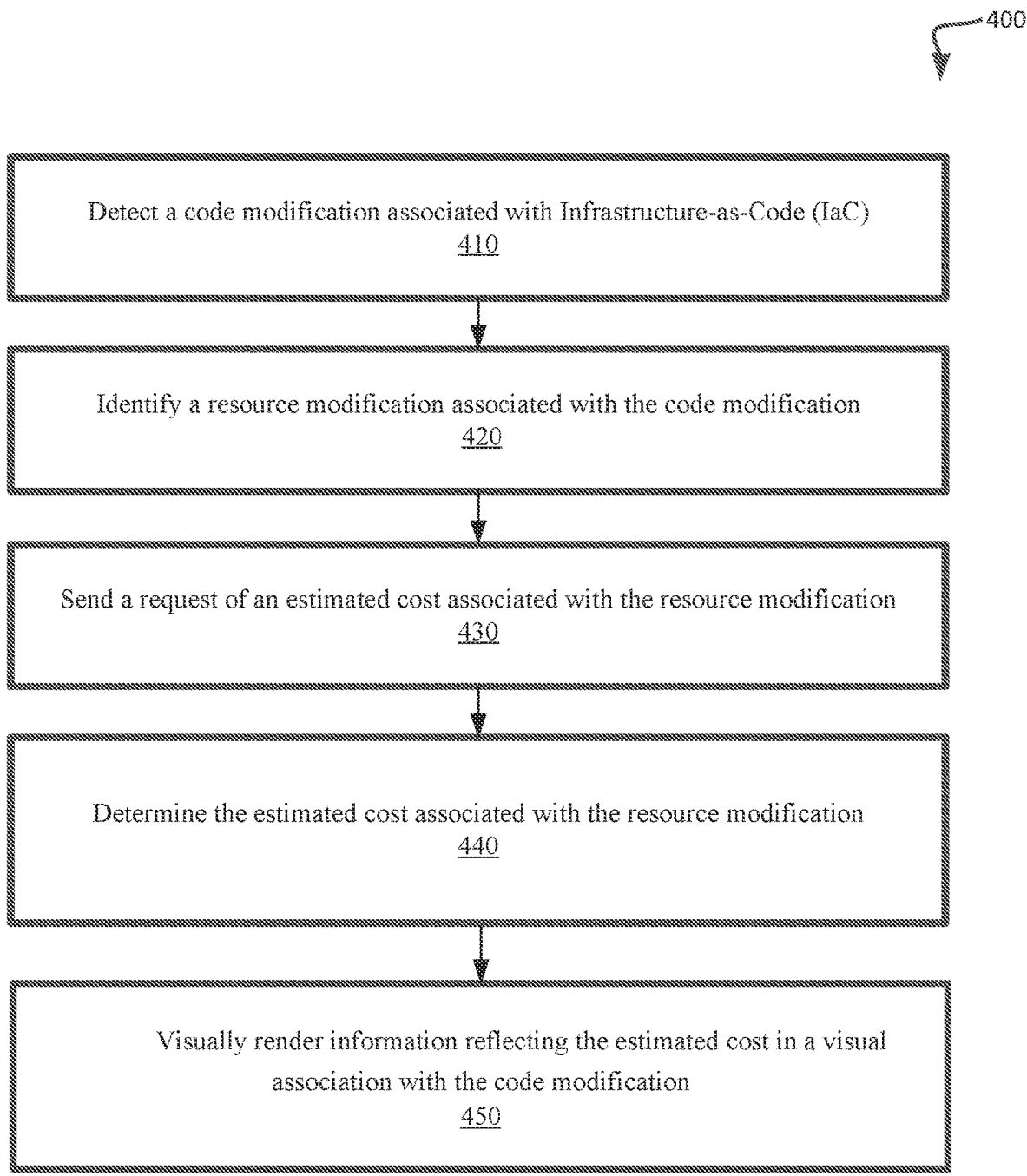
FIG. 4 depicts a flow diagram of an example method for performing an infrastructure cost estimation with an integrated development environment, in accordance with one or more aspects of the present disclosure.

FIG. 4 depicts a flow diagram of an example method 400 for performing code review during an active build, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by an executable code of a host machine (e.g., host operating system or firmware), a virtual machine (e.g., guest operating system or virtual firmware), an external device (e.g., a PCI device), other executable code, or a combination thereof.

Method 400 may be performed by a processing device of an integrated development environment. At block 410, the processing device may detect a code modification associated with IaC module. In some implementations, the processing device may monitor a data store for a code modification associated with Infrastructure as Code (IaC). In some implementations, the processing device may track by communicating with a tool used for the code modification via a program capable of handling periodic requests for estimated cost. In some implementations, the processing device may track by communicating with a tool used for the code modification upon receiving a request for estimated cost.

In some implementations, the processing device may need to initiate an infrastructure cost estimation process. To initiate the infrastructure cost estimation process, the processing device may perform one or more authentication operations to connect with infrastructure provider for obtaining the information from the respective infrastructure provider. In some implementations, the processing device may be authenticated to connect to an infrastructure provider to use an API for a request of cost estimation.

At block 420, the processing device may identify a resource modification associated with the code modification. In some implementations, the processing device may convert the code modification to a resource modification. For example, the processing device may translate the changes in the infrastructure code (e.g., source code) to the data that can be used for requesting. In some embodiments, the processing device may verify the code modification before converting the code modification. For example, the processing device may verify the IaC modification data for certain errors (e.g., syntax errors, logic errors, compilation errors, runtime errors, and so on).

At block 430, the processing device may send a request of an estimated cost associated with the resource modification. In some embodiments, the processing device may send the request to an infrastructure provider. For example, the processing device may send the request to an infrastructure provider that has authenticated the processing device and connected with the processing device. In some embodiments, a specific infrastructure provider is an intended recipient for the request, which the processing device has not been authenticated to connect with, and in such case, the processing device may send the request to a public price repository.

At block 440, the processing device may determine the estimated cost associated with the resource modification. In some implementations, the processing device may determine the estimated cost by receiving the estimated cost associated with the resource modification. The received estimated cost may include a customized price, a generalized price, or a public price. In some implementations, the infrastructure provider may provide a customized price or a generalized price according to the resource modification. In some implementations, the public price repository may provide a public price according to the resource modification. In some implementations, the processing device may determine the estimated cost by analyzing the received estimated cost associated with the resource modification. In some implementations, the processing device may generate a recommendation based on the analysis of the estimated cost associated with the code modification.

At block 450, the processing device may visually render information reflecting the estimated cost in a visual association with the code modification. In some implementations, the processing device may display, via a graphical user interface (GUI) of the integrated development environment, the recommendation along with the code modification.

In some implementations, the processing device may generate the recommendation according to the received estimated cost. In some implementations, the processing device may obtain a current cost associated with the IaC and generate the recommendation based on comparing the estimated cost with the current cost associated with the IaC. For example, the processing device may determine that the estimated cost is lower than the current cost, and the processing device may then generate a recommendation to accept the code modification. In another example, the processing device may determine that the estimated cost is higher than the current cost, and the processing device may then generate a recommendation to refuse the code modification. In yet another example, the processing device may determine that the value difference between the estimated cost and the current cost is within a predetermined range, and the processing device may then generate a recommendation to accept the code modification.

In some implementations, the processing device may obtain a threshold criterion for cost and generate the recommendation based on the estimated cost satisfying the threshold criterion. For example, the processing device may determine that the estimated cost exceeds a predefined value and thus determine that the estimated cost does not satisfy the threshold criterion, and the processing device may then generate a recommendation to refuse the code modification. In another example, the processing device may the estimated cost does not exceed a predefined value and thus determine that the estimated cost satisfies the threshold criterion, and the processing device may then generate a recommendation to accept the code modification.

Figure 5:
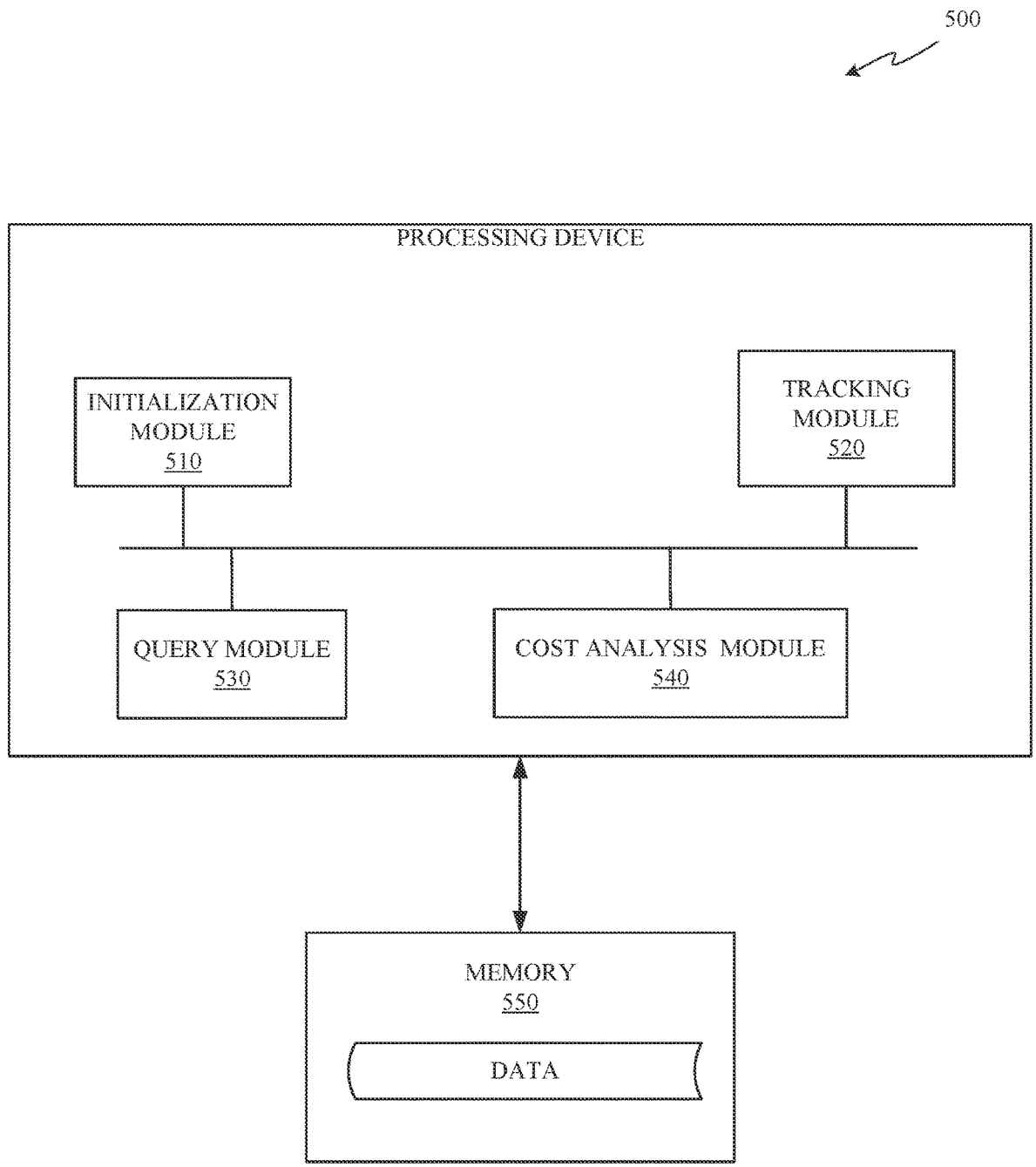
FIG. 5 depicts a block diagram of a computer system operating in accordance with one or more aspects of the present disclosure.

FIG. 5 depicts a block diagram of a computer system 500 operating in accordance with one or more aspects of the present disclosure. One or more of the components of FIG. 1 may execute on computer system 500. Computer system 500 may be the same or similar to client 111 of FIG. 1, and may include one or more processors and one or more memory devices. In the example shown, computer system 500 may include initialization module 510, tracking module 520, query module 530, cost analysis module 540, and memory 550.

Initialization module 510 may initiate execution of an infrastructure cost estimation instruction. In some embodiments, initialization module 510 may receive an indication to execute a particular set of instructions specifying when to perform a particular infrastructure cost estimation. In some embodiments, initialization module 510 may access memory 550 to obtain data representing the initial resources managed within in IaC modules and obtain the initial infrastructure cost. In some embodiments, initialization module 510 may send one or more authentication requests to obtain the permission to connect to the respective infrastructure provider to use API for infrastructure cost calculation.

Tracking module 520 may detect the IaC modification and convert the IaC modifications data to data representing the change of the infrastructure resources ("resource modification data"), where the resource modification data can be used by other components (e.g., query module 530 and/or cost analysis module 540) for infrastructure cost analysis. In some embodiments, tracking module 520 may communicate with a tool to retrieve and/or receive IaC modification data. The IaC modification data may include which line of the infrastructure code is being modified, whether a programming error (e.g., syntax error, logic error, compilation error, runtime error) occurred with the modification, and so forth. In some embodiments, tracking module 520 may perform a set of pre-conversion operations, such as verifying the IaC modification data for certain errors (e.g., syntax errors, logic errors, compilation errors, runtime errors, and so on).

Query module 530 may generate a command querying for infrastructure cost, send the query to infrastructure provider or other cost provider, and receive, from the provider, a response regarding the infrastructure cost price. Query module 530 may store the infrastructure cost price ("estimated cost") in the memory 550. In some implementations, query module 530 may send a request of an estimated cost associated with the resource modification data, and in response, receive the estimated cost associated with the resource modification data. The request may include the resource modification data. In some implementations, query module 216 may send the request to an infrastructure provider that has been authenticated and connected with the processing device. The infrastructure provider may provide a customized price or a generalized price according to the resource modification data. In some implementations, a specific infrastructure provider is an intended recipient for the request, which the processing device has not been authenticated to connect with, and in such case, the query module 530 may send the request to a public price repository, and the public price repository may provide a public price according to the resource modification data.

Cost analysis module 540 may analyze the estimated cost and generate a recommendation regarding the code modification based on the analysis of the estimated cost. In some implementations, the cost analysis module 540 may analyze the estimated cost by comparing the estimated cost with a current infrastructure cost. In some implementations, the cost analysis module 540 may analyze the estimated cost by determining whether the estimated cost satisfies a threshold criterion. Cost analysis module 540 may notify other device of the recommendation associated with the code modification. The processing device may provide a GUI to display the recommendation (e.g., displayed in a form of message) along with the code modification.

Figure 6:
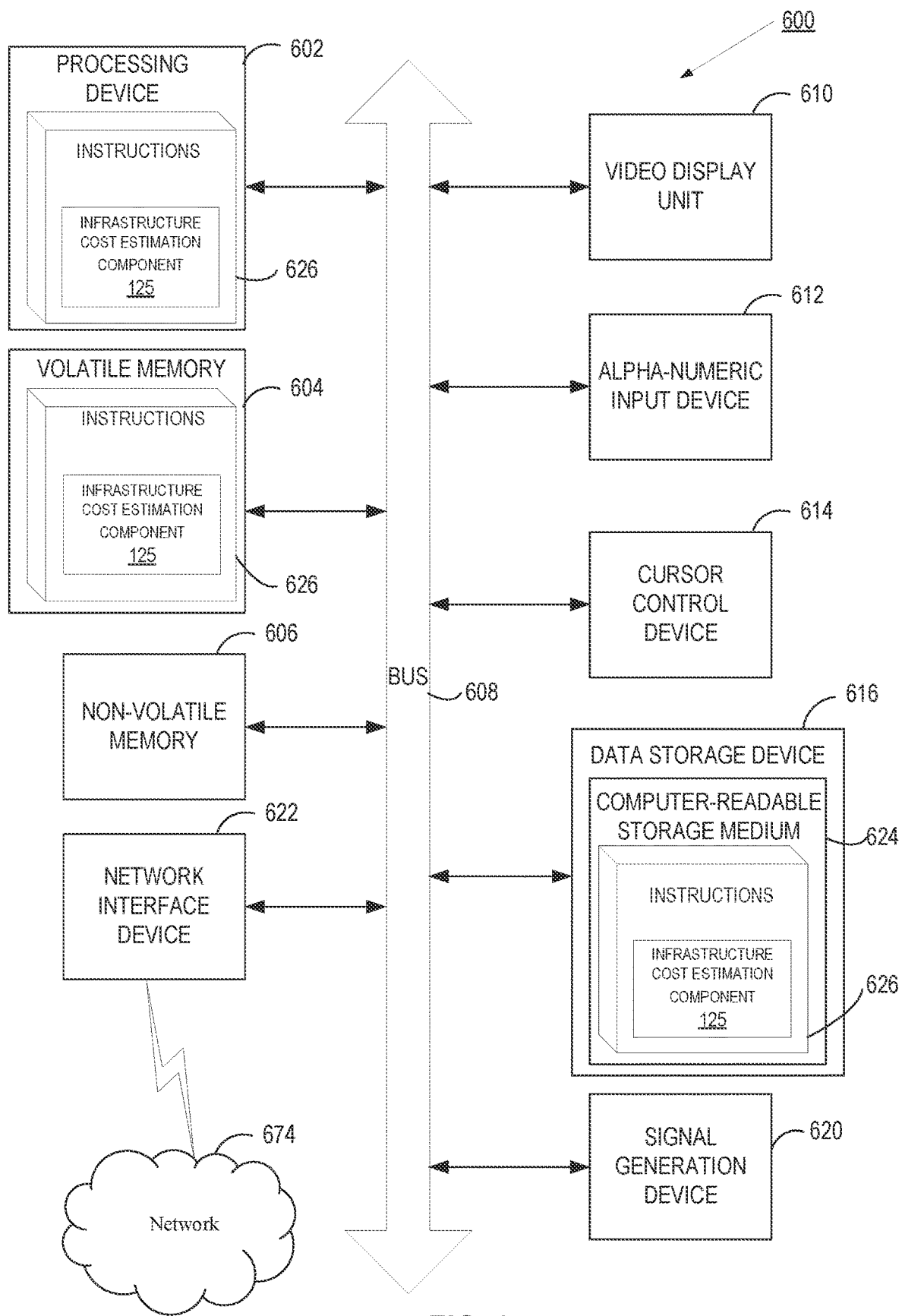
FIG. 6 depicts a block diagram of an example computer system operating in accordance with one or more aspects of the present disclosure.

FIG. 6 depicts a block diagram of a computer system operating in accordance with one or more aspects of the present disclosure. In various illustrative examples, computer system 600 may correspond to computing environment 100 of FIG. 1. Computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions for implementing methods 300 and 600.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   detecting, by an integrated development environment (IDE), a code modification to one or more lines of code of a plurality of lines of code of an Infrastructure as Code (IaC) module that configures computing infrastructure based on the plurality of lines of code;
   prior to deployment of the code modification to the one or more lines of code of the plurality of lines of code of the IaC module, identifying a resource modification associated with the code modification;
   determining an estimated cost associated with the resource modification; and
   visually rendering a graphical user interface (GUI) of the IDE for display, wherein the GUI of the IDE comprises:
      information reflecting the estimated cost associated with the resource modification; and
      a visual association that links the information reflecting the estimated cost associated with the resource modification to the one or more lines of code.

2. The method of claim 1, wherein determining the estimated cost comprises:
   sending a request for the estimated cost associated with the resource modification; and
   receiving the estimated cost associated with the resource modification.

3. The method of claim 2, further comprising:
   sending an authentication request to an infrastructure provider to use an application programming interface (API) for the request for the estimated cost,
   wherein the request for the estimated cost is sent to the infrastructure provider.

4. The method of claim 2, wherein the request for the estimated cost is sent to a public price repository.

5. The method of claim 1, wherein the estimated cost comprises at least one of a customized price, a generalized price, or a public price.

6. The method of claim 1, further comprising:
   obtaining a current cost associated with the IaC module, and
   generating a recommendation regarding the code modification to the one or more lines of code of the plurality of lines of code of the IaC module based on comparing the estimated cost with the current cost associated with the IaC module.

7. The method of claim 1, further comprising:
   obtaining a threshold criterion for cost; and
   generating a recommendation regarding the code modification to the one or more lines of code of the plurality of lines of code of the IaC module based on the estimated cost satisfying the threshold criterion.

8. The method of claim 1, wherein detecting the code modification to the one or more lines of code of the plurality of lines of code of the IaC module comprises:
communicating with a tool used for the code modification via a program capable of handling periodic requests for data.

9. The method of claim 1, wherein detecting the code modification comprises:
communicating with a tool used for the code modification to the one or more lines of code of the plurality of lines of code of the IaC module upon receiving a request for data.

10. The method of claim 1, wherein the GUI of the IDE further comprises:
a recommendation regarding the code modification along with the code modification to the one or more lines of code of the plurality of lines of code of the IaC module.

11. A system comprising:
a memory;
a processing device operatively coupled to the memory, of an integrated development environment, the processing device configured to perform operations comprising:
detecting, by an integrated development environment (IDE), a code modification to one or more lines of code of a plurality of lines of code of an Infrastructure as Code (IaC) module that configures computing infrastructure based on the plurality of lines of code;
prior to deployment of the code modification to the one or more lines of code of the plurality of lines of code of the IaC module, identifying a resource modification associated with the code modification;
determining an estimated cost associated with the resource modification; and
visually rendering a graphical user interface (GUI) of the IDE for display, wherein the GUI of the IDE comprises:
information reflecting the estimated cost associated with the resource modification; and
a visual association that links the information reflecting the estimated cost associated with the resource modification to the one or more lines of code.

12. The system of claim 11, wherein determining the estimated cost comprises:
sending a request for the estimated cost associated with the resource modification; and
receiving the estimated cost associated with the resource modification.

13. The system of claim 12, wherein the processing device is further configured to perform operations comprising:
sending an authentication request to an infrastructure provider to use an application programming interface (API) for the request for the estimated cost,
wherein the request for the estimated cost is sent to the infrastructure provider.

14. The system of claim 12, wherein the request for the estimated cost is sent to a public price repository.

15. The system of claim 11, wherein the estimated cost comprises at least one of a customized price, a generalized price, or a public price.

16. The system of claim 11, wherein the processing device is further configured to perform operations comprising:
obtaining a current cost associated with the IaC module, and
generating a recommendation regarding the code modification to the one or more lines of code of the plurality of lines of code based on comparing the estimated cost with the current cost associated with the IaC module.

17. The system of claim 11, wherein the processing device is further configured to perform operations comprising:
obtaining a threshold criterion for cost; and
generating a recommendation regarding the code modification to the one or more lines of code of the plurality of lines of code of the IaC module based on the estimated cost satisfying the threshold criterion.

18. The system of claim 11, wherein the GUI of the IDE further comprises:
a recommendation regarding the code modification along with the code modification to the one or more lines of code of the plurality of lines of code of the IaC module.

19. A non-transitory machine-readable storage medium storing executable instructions that, when executed by a processing device, cause the processing device to perform operations comprising:
detecting, by an integrated development environment (IDE), a code modification to one or more lines of code of a plurality of lines of code of an Infrastructure as Code (IaC) module that configures computing infrastructure based on the plurality of lines of code;
prior to deployment of the code modification to the one or more lines of code of the plurality of lines of code of the IaC module, identifying a resource modification associated with the code modification;
determining an estimated cost associated with the resource modification; and
visually rendering a graphical user interface (GUI) of the IDE for display, wherein the GUI of the IDE comprises:
information reflecting the estimated cost associated with the resource modification; and
a visual association that links the information reflecting the estimated cost associated with the resource modification to the one or more lines of code.

20. The non-transitory machine-readable storage medium of claim 19, wherein determining the estimated cost comprises:
sending a request for the estimated cost associated with the resource modification; and
receiving the estimated cost associated with the resource modification.

* * * * *